United States Patent [19]

Heinz geb Belgardt et al.

[11] Patent Number: 4,787,717

[45] Date of Patent: Nov. 29, 1988

[54] ELECTROCHROMIC INDICATOR DEVICE WITH REFLECTING BACKGROUND

[75] Inventors: Jutta Heinz geb Belgardt, Gerlingen; Helmut Sautter, Ditzingen; Rainer Schink, Leonberg; Lothar Weber, Stuttgart, all of Fed. Rep. of Germany

[73] Assignee: Robert Bosch GmbH, Stuttgart, Fed. Rep. of Germany

[21] Appl. No.: 477,616

[22] Filed: Mar. 22, 1983

[30] Foreign Application Priority Data

Mar. 30, 1982 [DE] Fed. Rep. of Germany ....... 3211638

[51] Int. Cl.⁴ .......................... G02F 1/01; B05D 5/12
[52] U.S. Cl. ................................. 350/357; 427/126.3
[58] Field of Search .................... 350/357; 427/126.3, 427/126.6, 126.4

[56] References Cited

U.S. PATENT DOCUMENTS

Re. 30,835 12/1981 Giglia ................................. 350/357

Primary Examiner—John K. Corbin
Assistant Examiner—David J. Edmondson
Attorney, Agent, or Firm—Frishauf, Holtz, Goodman & Woodward

[57] ABSTRACT

A pigment is mixed with an epoxy resin or varnish binder in a weight ratio from 5:1 to 6:1 to make a paste, which is then applied as a thin layer by screen printing on top of the counterelectrode layer previously baked onto a metal substrate. In another baking step the new layer for producing a reflective coating is heated to between 120° and 180° C., in which temperature range the binder produces small bubbles before hardening, so that the layer that is produced is permeable to ions when the layer becomes soaked with electrolyte in the assembled electrochromic device. The metal substrate is shaped by drawing to provide the electrolyte cavity after the application of the counterelectrode and the reflecting background layer thereon, since the deformation does not damage either of these layers.

2 Claims, 1 Drawing Sheet

U.S. Patent
Nov. 29, 1988
4,787,717
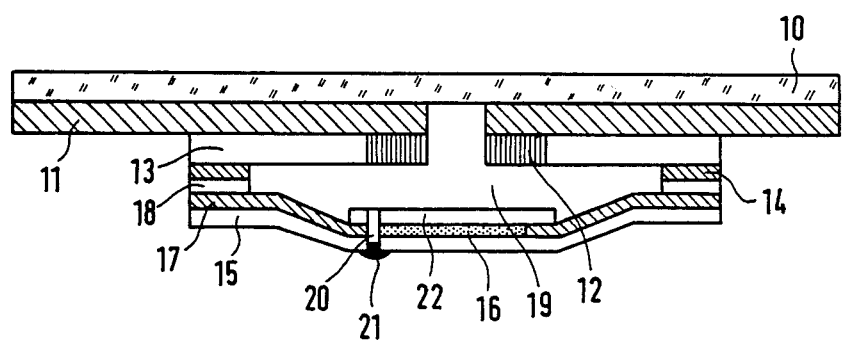

ELECTROCHROMIC INDICATOR DEVICE WITH REFLECTING BACKGROUND

This invention concerns an electrochromic indicating device formed with two substrates enclosing an electrolyte chamber, the front substrate being transparent or translucent and having a transparent or translucent conducting layer on the inner side thereof, on which an electrochromic electrode of the oxide of a transition metal is seated, while the rear substrate carries a counterelectrode on the inside. More particularly, the invention concerns such a device in which a porous reflecting background is provided between the electrodes.

Such an electrochromic indicator device is known from published German patent application DE-OS No. 29 02 511. The device there described has a porous ceramic plate of aluminum oxide for providing the background. This plate, on the one hand, is very brittle and therefore difficult to machine and to treat and, on the other hand, it requires supplementary space that notably raises the overall thickness of the indicating device.

THE INVENTION

It is an object of the present invention to provide a reflecting background between the electrodes which has the necessary porosity and reflectivity, can be made in a choice of colors, is easily manufactured and handled, and does not appreciably increase the thickness of the device.

Briefly, a background layer is provided as a thin layer or coating applied in the form of a paste or varnish, or the like, which is porous when it is hardened by baking. It is preferably provided on the counterelectrode, although in principle it may be provided on the front electrode, behind it in the direction of view.

The electrochromic indicator device according to the invention has the advantage that it can be produced simply and with few process steps, because it can be put in place with common coating methods, such as spraying, stamping, rolling or electophoretic deposition. It has been found particularly suitable to apply the coating with the screen printing process. This coating is extremely elastic in the case of deformation in common with a metallic substrate and withstands deformations by deep drawing processes without damage. The layer thickness is reproducible and slight, so that unusually flat cells can be manufactured.

The reflecting layer is made of a mixture of a pigment and a binder resin that is preferably suitable for screen printing and can be hardened at a temperature at which some gas is given off before hardening to produce permanent porosity. A ratio of binder to pigment is recommended which lies in the range from 1:5 to 1:6.

It has been found particularly effective to use $TiO_2$ as a pigment for the background layer because with this pigment a strongly reflecting porous layer of white color can be produced. Other suitable pigments are aluminum oxide for a white background or zinc chromate, cadmium sulfide, minium (red lead), cobalt blue and chromium oxide when other background colors are desired. With the use of these pigments also, and the same binders in the same proportions, very good effective background layers can be produced. The grain size of the pigment should lie in the region from 1 to 5 $\mu$m.

From the process standpoint, the screen printing process has proved particularly effective for applying the background layer. In this process, a paste is made of pigment powder and a binder suitable for screen printing, such as a synthetic resin varnish or epoxy resin and, after printing, the coating is baked. The reflecting background layer is preferably applied right after the provision of the counterelectrode, being provided in an additional screen printing step on top of the latter, but in principle it can also be applied on the oppositely disposed electrode that faces the observer. The porosity of the background layer is automatically produced by the choice of a suitable binder for the paste with respect to the baking process, since evaporation of the binder producer pores which are preserved in the hardening of the background layer. The baking of the background layer typically takes place in the region from 120° C. to 180° C.

THE DRAWING

The invention is further described by way of illustrative example with reference to the annexed drawing, the single figure of which schematically shows a section through an electrochromic indicator device.

DESCRIPTION OF THE ILLUSTRATED EMBODIMENT

An electrochromic indicator device is shown in the drawing having a glass plate 10 on its outer side facing the observer. This plate is a substrate on which a transparent electrically conducting layer 11 is applied for supplying current to the device. As a picture element there is provided a layer 12 of transition metal oxide that sits on top of the conductive layer 11 and is laterally surrounded by a protective layer 13 that adjoins the layer 12 practically without intermediate space at the junction of 12 and 13. The protective layer 13 thus covers the exposed area of the conductive layer 11 on the inside of the indicator device. At the outer rim of the indicator device, an adhesion promoting layer 14 is applied on top of the protective layer 13.

The further construction of the electrochromic indicator device is provided on a second substrate externally facing away from the observer which does not need to be transparent or translucent and, in the illustrated case, consists of a metal plate 15. On the interior side of this plate, there is provided, not far from the layer 12, a counterelectrode 16 to which there is connected laterally an adhesion promoting layer 17 which, at the same time, provides the electrical and chemical insulation of the metal plate 15. The two substrates are connected together by an adhesive 18 which bonds excellently on the adhesion promoting layers 14 and 17 on both sides of it, and thus forms a tight seal for the cell. The interior space of the electrochromic indicating device is filled with an electrolyte 19, which is introduced through a fill opening 20. The latter is sealed by a solder plug 21 after the device has been filled with electrolyte. A completely covering porous layer 22 lies over the counterelectrode 16 and constitutes the reflecting background layer.

The conducting layer 11 on the inner side of the glass plate 10 consists of transparent material, e.g. of In$_2$O$_3$/Sb, while the electrochromic layer 12 consists of a transition metal oxide, regarding which reference is made to the copending application of the same priority date as the present application, Ser. No. 06/477,618, filed 3/22/83, owned by the assignee of the present application. The metal plate 15, which provides the substrate on the side opposite from the observer, is formed by a deep drawing process after the provision of the counterelectrode 16, the adhesion promoting layer 17 and the background layer 22, all of which have sufficient elasticity and cohesion for carrying out deep drawing. The electrolyte 19 contains a lithium salt ($LiClO_4$, $LiBF_4$ or $LiAsF_6$) which is dissolved in an organic solvent such as propylene carbonate or $\gamma$-butyrolactone. The counterelectrode 16 has a layer thickness of 10 to 70 $\mu m$ and the reflecting background layer 22, a thickness of 20 to 50 $\mu m$, preferably of about 25 $\mu m$.

The activity of the electrochromic indicator device here described consists in a color change of the electrochromic layer 12 when a negative voltage of 0.5 to 2 volts, with respect to the potential of the metal plate 15, is applied to the conductive layer 11. Decoloration takes place with reverse polarity or as the result of a shortcircuit. The coloring is produced by a migration of $Li^+$ ions out of the electrolyte 19 into the layer 12, and at the same time, out of the counterelectrode 16 into the electrolyte 19. Decoloration takes place by ion migration in the reverse direction. The layer 17 fulfills at the same time the function of an insulating layer with respect to the electrolyte 19 and the function of an adhesion promoting layer in the neighborhood of the cementing location 18. The layer 17 does not participate in the electrochemical processes.

The counterelectrode 16 has the capability of taking up or giving off ions, according to the polarity of the applied voltage. These events should take place with the lowest possible voltage drop and should be reversible, i.e., they should run without interfering side reactions. The potential of the counterelectrode 16 should be as constant as possible up to a charge density of 10 $mC/cm^2$. The charge density which leads to a potential change of 1 volt serves as a measure for the quality of the electrochromic indicating device. Since this magnitude has the dimension of a capacitance density, it is called the specific charge capacity.

An activated vegetable charcoal is used as the active material of the counterelectrode 16, since activated carbon of that type has a structure that is particularly favorable for activation and has a large inner surface. A suitable product for this purpose is commercially available under the trademark designation "NORIT BRX". The activated charcoal is introduced as a granulate of a grain size from 0.2 to 2 $\mu m$. In order to apply it in the form of a thin layer, a paste is made of the granulate with the addition of binder. The paste is applied to the inner side of the metal plate 15, where it forms a firmly bonded layer with the desired properties after a baking process. A single component epoxy resin and synthetic resin varnish have been found particularly effective as binders which permit the preparation of screen-printable pastes, but it is also possible to apply the layers by other useful conventional coating processes. What is essential is that the counterelectrode and/or the background layer should not consist of a separate plate, foil, sintered body, felt, web or the like, since these would again make special measures necessary for introducing them into the cell and for a firmly adhering connection with the metal plate 15. An important further requirement is the permanence of the layers, especially their resistance to attack by the electrolyte 19 up to a temperature of +85° C. For the preparation of screen-printable pastes, the epoxy resin or synthetic resin varnish is mixed with activated carbon granulate in a ratio in the range from 2:1 to 1:1 for the counterelectrode layer 16 and mixed with the pigment for the reflecting background layer 22 in a ratio in the range from 1:5 to 1:6. A suitable epoxy resin that is commercially available for the use here described is known under the designation EK12 of the WEVO-Chemic company; a commercially available synthetic resin varnish for this application is an acrylate-melamine system produced by the LESONAL company. Instead of printing the reflecting background layer 22 on top of the fully prepared counter-electrode layer 16, the layer 22 can be printed on top of the layer 16 before the latter is baked, and both layers can be hardened in a single step.

The background layer 22 must allow ions to pass through it, but optically must form a strongly reflecting white or colored light-scattering and opaque layer which fully covers the counterelectrode. The materials and processes of the invention make it possible to produce, in particular, the layers 16, 17 and 22 with advantageous conventional coating methods in an especially simple, time-saving and economic manner.

$TiO_2$ in the form of raw rutile having a grain size from 1 to 5 $\mu m$ is preferably used as the pigment for the background layer 22. Other suitable pigments which should be available with the same grain size, are aluminum oxide ($Al_2O_3$) for a white color, zinc chromate ($ZnCrO_4$) or cadmium sulfide ($CdS$) for a yellow coloring, minium ($Pd_3O_4$) for red coloring, cobalt blue ($CoO.Al_2O_3$) for blue coloring and chromium oxide ($Cr_2O_3$) for green coloring. The previously mentioned synthetic resin varnish in a weight ratio of binder to pigment of 1:5 to 1:6 is suitable for the binder. The printability of the resulting paste for the screen printing process is further improved by additives as, for example, terpineol. The background layer is preferably applied on top of the counterelectrode 16, but it can also be applied on the interior side of the glass plate 10 and its other layers. The baking temperature for the background layer lies in the range from about 120° C. to about 180° C. In this temperature range, there is a formation of small bubbles by the decomposition of the binder, as the result of which the background layer 22 retains its porous structure in baking. The thickness of the background layer so produced is preferably about 25 $\mu m$. Althought the background layer 22 is opaque, it becomes soaked with electrolyte 19 because of its porosity and thereby allows lithium ions to pass through. The use of other pigments for coloring the background layer 22 has already been described, but it is also possible to color the $TiO_2$ layer by the addition of dyes. The background layer 22 can, furthermore, be printed additionally with scales or permanent symbols related as information signals to the indication fields. The layer itself can also be used for representing such symbols and for limiting the indicator field by applying it in a corresponding pattern instead of over the whole surface of the counterelectrode 16.

The background layer 22 and the underlying counterelectrode 16 adhere firmly to the underlying substrate and are elastic in such a way that they are deformable in common with the substrate. Especially when a metal plate 15 is used as the substrate, the layers 16 and 22 can be applied to a flat metal disk before the final shape of the substrate is produced by deep drawing. The overall thickness of the layer system composed of the layers 16 and 22 is in any case less than 100 $\mu m$.

Although the invention has been described with reference to particular illustrative examples, it will be understood that other modifications and variations are possible within the inventive concept.

We claim:

1. A process of producing an electrochromic indicating device with a porous reflecting background layer comprising the steps of:

applying a counterelectrode layer, having the capability of taking up or giving off ions according to the polarity of voltage applied to the device, to a metal substrate, said counterelectrode layer being thereby supported on said substrate;

preparing a paste or varnish comprising an inorganic pigment and a synthetic resin binder, as material for making a reflecting background layer;

applying said paste or varnish in a layer on top of said counterelectrode layer by a screen printing method, baking said substrate, counterelectrode layer and paste or varnish layer in a baking process such that a porous reflecting background layer is formed when said binder therein becomes hardened by baking;

subjecting said metal substrate and said baked layers thereon to deep drawing deformation producing a depression therein for forming a cavity in said electrochromic device for containing an electrolyte;

preparing a second substrate, wherein said substrate is transparent and is overlaid with a transparent electric conducting layer, said conducting layer being covered on one surface both in a central region, by a layer of a transition metal oxide, and in a contiguous surrounding region, by a protective layer, such that said protective layer laterally surrounds the metal oxide layer, said conductive and oxide layers together constituting an electrochromic electrode, assembling the two substrates together such that the electrochromic electrode and paste or varnish layer face each other across said depression produced by drawing said metallic substrate, said assembly being fluid-tight except for a filling inlet, and filling the space corresponding to said depression with an electrolyte and sealing said electrolyte therein.

2. A process according to claim 1, in which said binder is a material which will produce interconnecting bubbles before it hardens, thereby producing open porosity in said background layer, and in which the baking step is carried out at a temperature in the range from 120° C. to 180° C.

* * * * *